United States Patent
Di Santo et al.

(10) Patent No.: US 9,871,474 B2
(45) Date of Patent: Jan. 16, 2018

(54) METHOD FOR SYNCHRONIZING A SYNCHRONOUS RELUCTANCE ELECTRIC MACHINE

(71) Applicant: REEL S.R.L., Nanto (VI) (IT)

(72) Inventors: Federico Di Santo, Sossano (IT); Enrico Marodin, Barbarano Vincentino (IT)

(73) Assignee: KSB AKTIENGESSELSCHAFT, Frankenthal (DE)

( * ) Notice: Subject to any disclaimer, the term of this patent is extended or adjusted under 35 U.S.C. 154(b) by 231 days.

(21) Appl. No.: 14/650,843

(22) PCT Filed: Dec. 10, 2013

(86) PCT No.: PCT/IB2013/060776
§ 371 (c)(1),
(2) Date: Aug. 14, 2015

(87) PCT Pub. No.: WO2014/091405
PCT Pub. Date: Jun. 19, 2014

(65) Prior Publication Data
US 2015/0340971 A1    Nov. 26, 2015

(30) Foreign Application Priority Data

Dec. 10, 2012 (IT) .............. VI2012A0331

(51) Int. Cl.
*H02K 19/02* (2006.01)
*H02P 23/14* (2006.01)
(Continued)

(52) U.S. Cl.
CPC ........... *H02P 1/029* (2013.01); *H02P 21/18* (2016.02); *H02P 21/32* (2016.02); *H02P 23/14* (2013.01); *H02P 25/08* (2013.01)

(58) Field of Classification Search
CPC ................... H02P 6/18; H02P 23/14
(Continued)

(56) References Cited

U.S. PATENT DOCUMENTS

2006/0097688 A1    5/2006  Patel et al.
2007/0001635 A1*   1/2007  Ho .................... H02P 1/029
                                                    318/400.11

(Continued)

OTHER PUBLICATIONS

Sungmin et al: "PWM Switching Frequency Signal Injection Sensorless Method in IPMSM," IEEE Transactions on Industry Applications, IEEE Service Center, Piscataway, NJ, vol. 48, No. 5, Sep. 1, 2012, pp. 1576-1587 p. 1584; Fig. 15.

*Primary Examiner* — Jorge L Carrasquillo
*Assistant Examiner* — Cortez Cook
(74) *Attorney, Agent, or Firm* — Themis Law

(57) ABSTRACT

A method of synchronizing a synchronous reluctance electric machine wherein the machine has no speed and/or residual magnetization voltage sensor and includes power terminals and rotating masses whose mechanical rotation frequency is subjected to speed transients caused by power cut-off conditions. The method includes at least one step of applying a control voltage with predetermined amplitude and duration to the terminals after the transients, and one step of detecting the electric current induced by the control voltage, the current induced by the voltage having a harmonic spectrum variable according to the frequency differential between the frequency of the control voltage and the mechanical rotation frequency of the rotating masses, to restore power and synchronous rotation control of the machine.

7 Claims, 3 Drawing Sheets

(51) Int. Cl.
  *H02P 1/02*   (2006.01)
  *H02P 25/08*  (2016.01)
  *H02P 21/32*  (2016.01)
  *H02P 21/18*  (2016.01)

(58) Field of Classification Search
  USPC ....................................... 310/68; 318/400.33
  See application file for complete search history.

(56) References Cited

U.S. PATENT DOCUMENTS

| | | |
|---|---|---|
| 2008/0030187 A1 | 2/2008 | Nguyen Phuoc |
| 2009/0269043 A1* | 10/2009 | Namuduri ............... B62D 5/046 388/819 |
| 2010/0045218 A1 | 2/2010 | Tomigashi |
| 2010/0064706 A1* | 3/2010 | Hattori ................. H02P 25/024 62/157 |
| 2011/0025241 A1* | 2/2011 | Kwon ................. H02P 21/0017 318/400.04 |
| 2011/0199031 A1* | 8/2011 | Balazovic ............... H02P 23/14 318/400.33 |
| 2011/0291601 A1 | 12/2011 | Ito et al. |
| 2012/0217849 A1* | 8/2012 | Aoki ........................ H02P 6/18 310/68 D |

\* cited by examiner

METHOD FOR SYNCHRONIZING A SYNCHRONOUS RELUCTANCE ELECTRIC MACHINE

FIELD OF THE INVENTION

The present invention generally finds application in the field of electric machine control devices, and particularly relates to a method of controlling a synchronous reluctance electric machine whose rotating masses are subjected to speed transients.

The invention also relates to an computer program product for implementing the above mentioned method, as well as an inverter with the computer program product loaded thereon.

BACKGROUND ART

Devices are known, which are used for controlling the operation of electric rotating machines, employed as electric power generators and/or electric motors.

Particularly, these control devices, commonly known as inverters, can control the operation of the electric machine by adjustment of the electrical parameters of power signals, when the latter are continuously supplied to the electric machine.

Nevertheless, the need is particularly felt in the field of controlling the operation of the electric machine when the rotating masses thereof are subjected to speed transients.

These transients occur after a physical interruption in the power distribution network, or after a temporary voltage reduction or possibly upon undesired or expected cut-off of power to the inverter.

Due to these transients, synchronism between the inverter and the rotating masses is particularly difficult to restore.

Particularly, during transients, speed variations in the machine may be either reduced due to internal friction or load resistance, or maintained or further enhanced due to the presence of external devices capable of transmitting a drive torque to the shaft of the electric machine.

The control of the machine is typically restored by an external machine stabilization and/or shutdown action, which requires a relatively long time.

Therefore, these methods have a particularly penalizing effect on restoration costs for the plants and devices that use the transient-affected electric machines.

In an attempt to obviate this drawback, optimized control methods have been suggested for the particular type of the rotating electric machine controlled by the inverter.

If the electric machine is of asynchronous type, then the rotation speed of the rotating masses may be determined by injecting an appropriate voltage with a frequency falling within the operating range of the electric machine and by later detecting the sign of the resulting induced current.

However, if the electric machine is of synchronous type, the rotation speed of the rotating masses may be determined by very high superimposed voltages and currents which generate high acoustic noise at low frequencies. This is a particularly serious drawback if many electric machines are installed in the same environment, and may be subjected to speed transients, causing the emission of high acoustic noise.

Furthermore, in sensorless electric machines, the synchronization of the rotating masses requires very long times, generally a few seconds.

Alternatively, when the electric machine is of permanent-magnet or synchronous reluctance type, the angular position or the rotation speed of the rotating masses is detected using appropriate external sensors mounted to the drive shaft of the machine or integrated in the inverter.

A first drawback of this solution is that the provision of external sensors reduces the reliability of synchronous reluctance electric machines.

These sensors have wearing mechanical parts that cause frequent failures or require periodic replacement.

A further drawback of this solution is that the use of sensors increases the overall maintenance costs of the electric machine.

Furthermore, the replacement of sensors requires a temporary shutdown of the electric machine, thereby considerably reducing its overall efficiency.

Also, the use of sensors may add complexity to the construction of the inverter and increase the overall dimensions of the electric machine.

DISCLOSURE OF THE INVENTION

The object of the present invention is to obviate the above drawbacks, by providing a method of controlling a synchronous reluctance electric machine after power cut-off transients that is highly efficient and relatively cost-effective.

A particular object of the present invention is to provide a method of controlling a synchronous reluctance electric machine after transients, that can increase the reliability of the machine, while reducing the emission of noise in the audible range.

A further object of the present invention is to provide a method of controlling a synchronous reluctance electric machine after transients, that can reduce manufacturing and maintenance costs for the electric machine.

A further object of the present invention is to provide a method of controlling a synchronous reluctance electric machine after transients, that can improve the overall efficiency of the electric machine.

Another important object of the present invention is to provide a method of controlling a synchronous reluctance electric machine after transients, that can provide relatively compact machines and reduce the complexity of inverters.

These and other objects, as better explained hereafter, are fulfilled by a method of controlling a synchronous reluctance electric machine as defined in claim 1.

This particular method will afford sensorless control, i.e. without using sensors, of a synchronous reluctance electric machine, during normal power supply conditions and during transients.

Advantageous embodiments of the invention are defined in accordance with the dependent claims.

BRIEF DESCRIPTION OF THE DRAWINGS

Further features and advantages of the invention will be more apparent upon reading of the detailed description of a preferred, non-exclusive embodiment of the method of the invention, which is described as a non-limiting example with the help of the annexed drawing, in which.

DETAILED DESCRIPTION OF A PREFERRED EMBODIMENT

Figure 1:
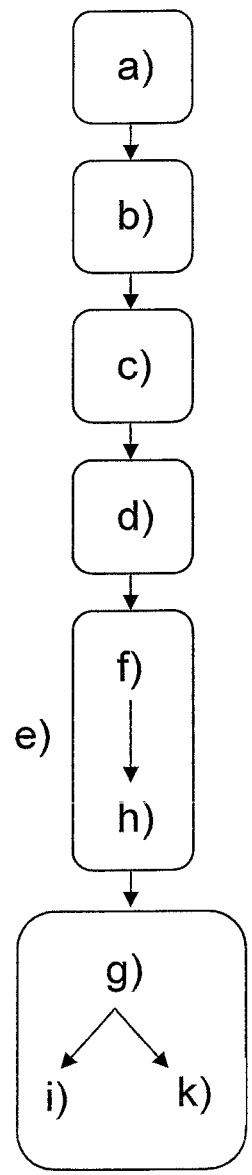
FIG. 1 is a block diagram of the method of controlling a synchronous reluctance electric machine subjected to speed transients.
Figure 3:
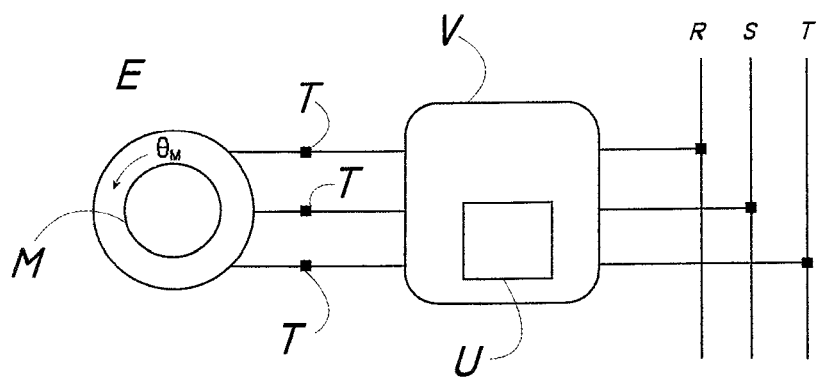
FIG. 3 shows a wiring diagram of a synchronous reluctance machine controlled by an inverter.

The annexed FIG. 1 shows a block diagram of controlling a synchronous reluctance electric machine, as schematically shown in FIG. 3, and generally referenced E, comprising power terminals T and rotating masses M connected to a load or an external actuator, not shown in the drawings.

Particularly, the synchronous reluctance electric machine may be an electric generator for generating electric power to be fed into a remote and/or local power-distribution network, or may be an electric motor adapted to provide torque to a drive shaft and/or an external point of use.

Typically, the rotating masses M of the synchronous reluctance electric machine may be subjected to speed transients caused by temporary supply voltage failure and generated, for instance, by power cut-off in the power distribution network.

Moreover, the rotating masses M may be also subjected to speed transients caused by external dynamic stresses on the load connected to the drive shaft, when the electric machine is off.

For example, these transients may be caused by the torque generated by a gust on the blades of a wind turbine or by an airstream on a fan of a ventilation duct.

Furthermore, the electric machine E and/or the inverter C, if any, connected thereto, are of the sensorless type, as is typically used for detecting the instantaneous rotation speed of rotating masses or for measuring the residual magnetization voltage in machine windings.

According to a peculiar feature of the invention, the method basically comprises a step of a) applying a control voltage $V_C$ with predetermined amplitude ($v_C$) and duration ($T_C$) to the terminals, after the transients, which voltage induces an electric current in the machine E, such current having a harmonic spectrum S that changes according to the frequency differential between the frequency $f_C$ of the control voltage $V_C$ and the mechanical rotation frequency $f_M$ of the rotating masses M.

This step is followed by a step of b) detecting the induced current $I_i$ to restore power and synchronous rotation control of the machine E.

This method will be able to restore control of the operation of the electric machine E when, due to speed transients, the instantaneous rotation parameters of the rotating masses M are unknown.

Conveniently, the control voltage $V_C$ may have a particularly short duration $T_C$. Preferably the duration $T_C$ of the control voltage $V_C$ may be comprised within a range of less than 2 s, and may also be less then one second.

The control voltage $V_C$ may be of DC or AC type, with a predetermined frequency $f_C$.

Furthermore, the amplitude $v_C$ and frequency $f_C$ of the control voltage $V_C$ may be either fixed or variable during application thereof.

Advantageously, the frequency $f_C$ and amplitude $v_C$ of the control voltage $V_C$ may be both variable throughout the duration of application $T_C$.

The amplitude $v_C$ and/or frequency $f_C$ of the control voltage $V_C$ may be automatically adjusted by the inverter of the electric machine E.

Alternatively, the control voltage $V_C$ may be manually adjusted by an operator.

Particularly, the equivalent impedance $X_{eq}$ of the electric machine E will change according to the frequency $f_C$ of the control voltage $V_C$.

According to a preferred non-limiting embodiment of the invention, the control voltage $V_C$ may be a sinusoidal voltage with an amplitude $v_C$ varying according to the equivalent impedance $X_{eq}$ of the electric machine E and the value of the desired induced current $I_i$.

Conveniently, the control voltage $V_C$ may generate a predetermined additional torque on the rotating masses M to maintain the inertial rotation speed of the rotating masses M substantially unchanged.

Particularly, the control voltage $V_C$ may have such an amplitude as to generate an additional torque of less than 5% the nominal torque of the electric machine E.

Furthermore, the additional torque may be a braking or an accelerating torque according to the instantaneous characteristics of the flux generated in the electric machine E due to the application of the control voltage $V_C$.

Advantageously, the control voltage may be adapted to generate an induced current $I_i$ whose harmonic spectrum has substantially zero harmonic components in the human audible range.

Particularly, the induced current may have a harmonic spectrum S having a substantially zero or very low average value at the high sensitivity area of the audible range.

For example, the harmonic spectrum S may have a substantially null or very low average value in the frequency range from 400 Hz to 2 KHz and will be dependent on the differential value ($f_C - f_M$).

Thus, during application of the control voltage $V_C$ the electric machine E will emit null or very little acoustic noise.

This will allow control of a plurality of synchronous reluctance electric machines installed in the same environment and subjected to speed transients without emitting high acoustic noise.

Figure 2:
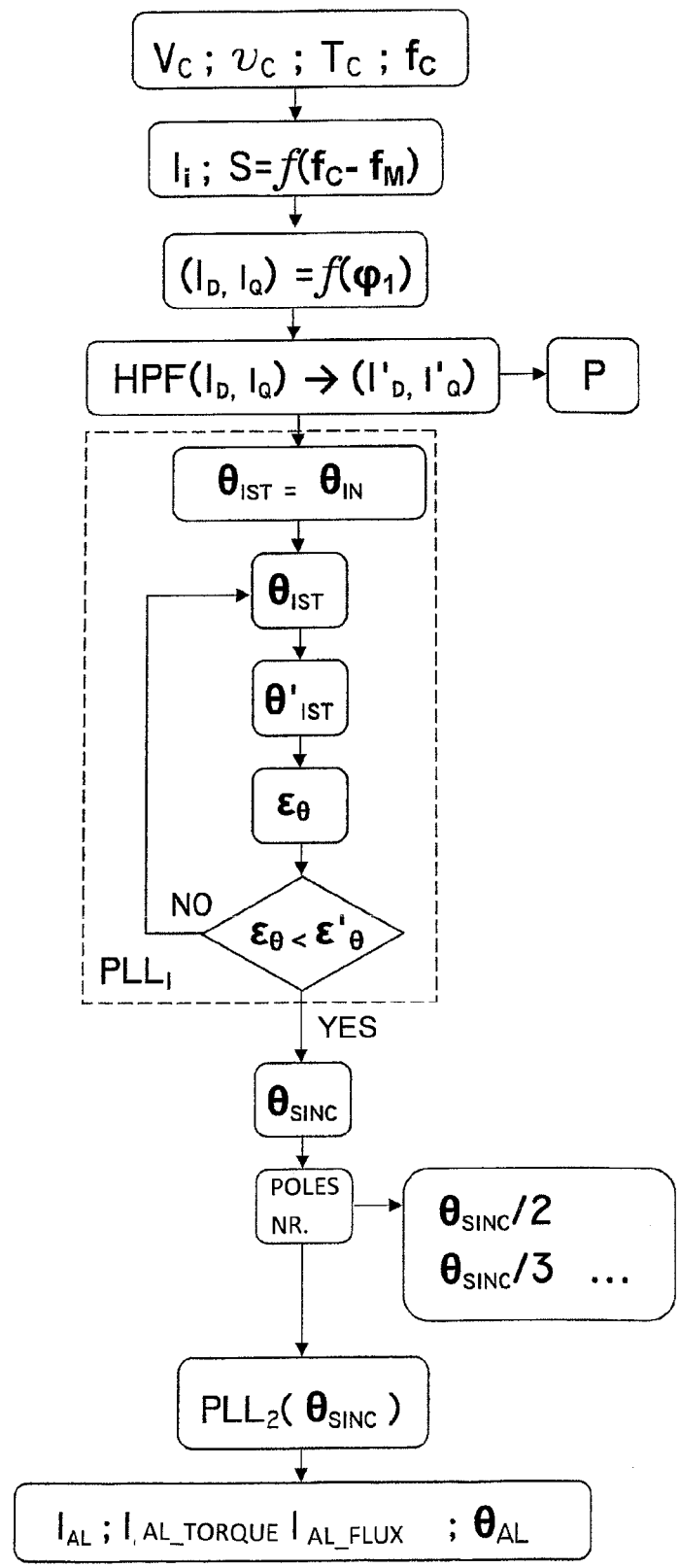
FIG. 2 shows a flow chart of the method of FIG. 1.

Conveniently, as best shown in FIG. 2, the method may include a step of c) decomposing the induced electric current $I_i$ into a pair of vector currents $I_d$, $I_q$ offset by substantially 90°.

Particularly, this decomposition of the induced electric current $I_i$ may be started from the angle $\varphi_{VC}$ associated with the control voltage $V_C$ provided to the terminals of the electric machine E.

Furthermore, with the decomposition of the induced current $I_i$ into a pair of vector components $I_d$, $I_q$, the harmonic component of the fundamental current, generated due to the application of the control voltage $V_C$ to the terminals, may be removed.

Conveniently, the method may comprise a step of d) filtering the pair of vector currents $I_d$, $I_q$ using a high-pass filter (HPF) to eliminate the direct current and obtain filtered vector current components $I'_d$, $I'_q$ with electrical parameters P changing according to the instantaneous rotation speed of the rotating masses M.

The high-pass filter (HPF) may have a predetermined mathematical weight, adapted to allow removal of any residual direct current in the vector currents $I_d$, $I_q$.

The filtered vector currents obtained in the filtering step d) may be substantially sinusoidal currents with equal amplitude, offset by 90°.

Conveniently, as best shown in FIG. 2, the method may include a step of e) setting the instantaneous rotation angle $\theta_{ist}$ of the rotating masses of the electric machine at an initial value $\theta_{in}$.

Furthermore, the angle setting step e) may be followed by a step of f) adjusting the instantaneous rotation angle $\theta_{ist}$ to determine a synchronized rotation angle $\theta_{sin\ c}$, substantially in phase with the mechanical rotation angle $\theta_M$ of the rotating masses M.

The method may further comprise a step of g) supplying the electric machine E with a vector current $I_{al}$ having a rotation angle $\theta_{al}$ calculated as a function of the synchronized angle $\theta_{sin\_c}$ and a torque component $I_{al\_torque}$ increasing from zero to the nominal value in a predetermined interval of time.

The gradual increase of the torque component $I_{al\_torque}$ of the supply voltage $I_{al}$ from zero to the nominal value will allow the control of the electric machine E to be restored without causing the rotating masses M thereof to undergo abrupt speed changes.

In a particularly advantageous aspect of the invention, the synchronized rotation angle $\theta_{sin\_c}$ obtained in the adjustment step f) may have an angular error $\epsilon_\theta$ that does not exceed a predetermined threshold $\epsilon'_\theta$, relative to the mechanical rotation angle $\theta_M$ of the rotating masses M.

Particularly, the threshold value for the angular error $\epsilon_\theta$ may be zero.

Conveniently, as best shown in FIG. 2, the step of f) adjusting the instantaneous rotation angle $\theta_{ist}$ may comprise an additional step of h) iteratively minimizing the angular error $\epsilon_\theta$ from the initial value $\theta_{in}$.

Particularly, the iterative step may be configured such that a rotation angle equal to zero $\theta_{in}$ is only used during the first cycle.

Iterative minimization of the angular error $\epsilon_\theta$ may be effected by comparing, at each cycle, the instantaneous rotation angle $\theta_{ist}$ generated in the previous cycle with an instantaneous rotation angle $\theta'_{ist}$ calculated during the current cycle.

The instantaneous rotation angle $\theta'_{ist}$ may be determined according to the instantaneous offset of the pair of filtered vector currents $I'_d$, $I'_q$ from the instantaneous rotation angle $\theta_{ist}$ generated in the previous cycle.

The iteration ends when the differential between the two angles $(\theta'_{ist}-\theta_{ist})$ results in an angular error equal to the threshold $\epsilon'_\theta$ or less.

The fulfillment of this condition allows the synchronized rotation angle $\theta_{sin\_c}$ to be set to the value of the instantaneous rotation angle $\theta'_{ist}$ calculated in the last iteration cycle.

Conveniently, the iterative minimization step h) may be obtained by means of a first phase-lock loop algorithm $PLL_1$ for generating the synchronized rotation angle $\theta_{sin\_c}$ as its output.

The algorithm $PLL_1$ may be designed to receive as an input the pair of filtered vector currents $I'_d$, $I'_q$ obtained from the filtering step d).

Furthermore, the step g) of supplying power to the electric machine E may comprise a step of i) conditioning the synchronized rotation angle $\theta_{sin\_c}$ generated by the first phase-lock loop algorithm $PLL_1$ as a function of the number of poles of the electric machine E.

For example, if the synchronous electric machine E has four or six poles respectively, the conditioning step i) will divide the synchronized rotation angle $\theta_{sin\_c}$ by two or three.

Conveniently, the power supply step g) may comprise an additional step of k) fine adjustment of the synchronized rotation angle $\theta_{sin\_c}$ by the rotation angle of the rotating masses M obtained using a second phase-lock loop algorithm $PLL_2$.

This algorithm $PLL_2$ generates as its output a fine synchronized rotation angle, whose initial value is expressed by the following formula:

$$PLL\_main.integ = PLL\_main.output = (\Delta\theta_{sin\_c}/n) - \Delta\theta v_c$$

wherein $\Delta\theta_{sin\_c}$ the increment of the synchronized rotation angle $\theta_{sin\_c}$ obtained as an output of the first algorithm $PLL_1$, n is the number of pole pairs of the electric machine E and $\Delta\theta v_c$ is the increment of the angle of the control voltage $V_C$ in the time unit.

Particularly, this adjustment step k) comprises an initial transient in which the vector supply current $I_{al}$ has a substantially zero torque component $I_{al\_torque}$ and a flux component $I_{al\_flux}$ having a predetermined value, for generating a flux lower than the nominal flux in the electric machine E.

Thus, the step of k) fine adjustment of the synchronization angle $\theta_{sin\_c}$ for synchronization with the mechanical rotation angle $\theta_M$ of the rotation masses M may be carried out with the electric machine operating in reduced fluxing conditions.

In these conditions, the flux value may be conveniently adjusted such that it never exceeds the end-of-scale limits imposed by the particular control technique in use for the synchronous reluctance electric machine E, which will afford a remarkably accurate adjustment of the synchronization angle $\theta_{sin\_c}$ for synchronization with the mechanical rotation angle $\theta_M$ of the rotating masses M.

It shall be further noted that the steps c) to k) may be carried out during the time $T_C$ of application of the control voltage $V_C$.

Thus, at the end of the time of application of the control voltage $V_C$, the electric machine E may be supplied with the vector supply current $I_{al}$ for restoring the rotating masses thereof to nominal speeds.

Thus, the inverter V connected to the machine E may control the operation of the rotating masses using known control techniques.

Conveniently, the above described method may be turned into an computer program product, comprising operating instructions for control of the electric machine E through the above method steps.

This computer program product may be stored on a storage medium of a programmable control unit U of an inverter V associated with the electric machine E for control of one or more electronic digital processing devices, not shown, which are adapted to execute the program and control electrical apparatus for generating and treating electric signals.

Therefore, the synchronous reluctance electric machine E may be controlled by the inverter V both at normal speed, and after unexpected events susceptible of causing speed transients of the rotating masses M of the machine.

The above description clearly shows that the method of the invention fulfils the intended objects and particularly meets the requirement of allowing control of a synchronous reluctance electric machine when the rotating masses are subjected to speed transients, with no sensor means mounted to the machine or its inverter.

The method of the invention is susceptible of a number of changes and variants, within the inventive concept disclosed in the appended claims. All the details thereof may be replaced by other technically equivalent parts, and the materials may vary depending on different needs, without departure from the scope of the invention.

While the method has been described with particular reference to the accompanying figures, the numerals referred to in the disclosure and claims are only used for the sake of a better intelligibility of the invention and shall not be intended to limit the claimed scope in any manner.

The invention claimed is:

1. A method of synchronizing a synchronous reluctance electric machine, wherein said electric machine (E) is speed and/or residual magnetization voltage sensorless and comprises power terminals (T) and rotating masses (M) whose mechanical rotation frequency (fM) is subjected to speed transients caused by power cut-off conditions, the method comprising:

applying a control voltage ($V_c$) with predetermined amplitude ($v_c$) and duration ($T_c$) to the power terminals after the speed transients, for inducing an electric current ($I_i$), wherein said electric current has a harmonic spectrum (S) that is a function of a frequency differential between a frequency ($f_c$) of said control voltage ($V_c$) and a mechanical rotation frequency (fM) of the rotating masses;

and detecting said induced electric current ($I_i$) to restore power and synchronous rotation control of the electric machine (E), wherein said harmonic spectrum (S) of said induced current ($I_i$) has substantially null or negligible harmonic components in an audible range, in response to the application of said control voltage ($V_c$) to the power terminals (T);

decomposing said induced electric current ($I_i$) into a pair of vector currents ($I_d$, $I_q$) offset by substantially 90°;

filtering said pair of vector currents ($I_d$, $I_q$) using a high-pass filter (HPF) to filter out a direct current component and obtain respective filtered vector components ($I'_d$, $I'_q$) dependent on an instantaneous rotation speed of the rotating masses (M);

detecting an instantaneous rotation angle ($\theta_{ist}$) of said rotating masses (M) of the electric machine (E);

setting an initial value ($\theta_{in}$) of the instantaneous rotation angle ($\theta_{ist}$) and adjusting said instantaneous rotation angle ($\theta$ist) to determine a synchronized rotation angle ($\theta_{sin\ c}$), substantially in phase with a mechanical rotation angle ($\theta_M$) and having an angular error ($\epsilon_\theta$) relative to the mechanical rotation angle ($\theta_M$);

supplying the electric machine (E) with a vector current ($I_{ai}$) having an electric rotation angle ($\theta_{ai}$) which is a function of said synchronized angle ($\theta_{sin\ c}$) and a torque component ($I_{ai}$ torque) increasing from zero to a nominal value in a predetermined interval of time, wherein the step of adjusting said instantaneous rotation angle ($\theta_{ist}$) comprises a step of iteratively minimizing said angular error ($\epsilon_\theta$) from the initial value ($\theta_{in}$), wherein the step of iteratively minimizing is obtained through a first phase-lock loop algorithm ($PLL_1$) for generating said synchronized rotation angle ($\theta_{sin\ c}$) as an output thereof, wherein the step of supplying the electric machine (E) with a vector current ($I_{ai}$) comprises a step of conditioning said synchronized rotation angle ($\theta_{sin\ c}$) generated by the first phase-lock loop algorithm ($PLL_1$) as a function of a number of poles of the electric machine (E), wherein the step of supplying the electric machine (E) with a vector current ($I_{ai}$) comprises a step of providing a fine adjustment of said synchronized rotation angle ($\theta_{sin\ c}$) obtained using a second phase-lock loop algorithm ($PLL_2$), having an initial transient in which said vector current ($I_{ai}$) has a substantially zero torque component ($I_{ai\ torque}$) and a flux component ($I_{ai\ flux}$) having a predetermined value, for generating a flux lower than a nominal flux in the electric machine (E), wherein the step of applying the control voltage ($V_c$) is carried out when the masses are rotating and after the speed transient;

and wherein said harmonic spectrum (S) is a function of a frequency differential between said frequency ($f_c$) of said control voltage ($V_c$) and said mechanical rotation frequency ($f_M$) of the rotating masses.

2. The method as claimed in claim 1, wherein said harmonic spectrum (S) has a substantially null average value in a frequency range from 400 Hz to 2 KHz, such that a substantially zero acoustic noise is generated in the electric machine (E).

3. The method as claimed in claim 1, wherein said control voltage ($V_c$) is of either of DC or AC type, and has a fixed or variable amplitude ($v_c$) during said duration ($T_c$).

4. The method as claimed in claim 1, wherein said control voltage ($V_c$) is calibrated to generate such a minimum torque on said rotating masses, as to maintain an instantaneous rotation speed of said rotating masses (M) substantially unchanged.

5. The method as claimed in claim 1, wherein said angular error ($\epsilon_\theta$) relative to said mechanical rotation angle ($\theta_M$) is lower than or equal to a predetermined threshold value ($\epsilon'_\theta$).

6. The method as claimed in claim 1, further comprising the step of providing a programmable control unit of an inverter that incorporates a non-transitory computer readable medium having operating control instructions stored therein for implementing the method as claimed in claim 1.

7. An inverter (V) for controlling a synchronous reluctance electric machine (E), comprising:
a programmable control unit (U) with a storage medium having a computer program product installed thereon for synchronizing the electric machine (E) as claimed in claim 6.

* * * * *